US012746464B2

(12) United States Patent

Nishibe et al.

(10) Patent No.: US 12,746,464 B2

(45) Date of Patent: Sep. 29, 2026

(54) INFORMATION PROCESSING APPARATUS AND IMAGE GENERATING METHOD

(71) Applicant: SONY INTERACTIVE ENTERTAINMENT INC., Tokyo (JP)

(72) Inventors: Mitsuru Nishibe, Chiba (JP); Takanori Minamino, Kanagawa (JP); Daisuke Tsuru, Chiba (JP)

(73) Assignee: Sony Interactive Entertainment Inc., Tokyo (JP)

( * ) Notice: Subject to any disclaimer, the term of this patent is extended or adjusted under 35 U.S.C. 154(b) by 457 days.

(21) Appl. No.: 18/356,247

(22) Filed: Jul. 21, 2023

(65) Prior Publication Data

US 2024/0033618 A1 Feb. 1, 2024

(30) Foreign Application Priority Data

Jul. 29, 2022 (JP) ................................ 2022-121444

(51) Int. Cl.

| | |
|---|---|
| ***A63F 13/26*** | (2014.01) |
| ***A63F 13/52*** | (2014.01) |
| ***G06T 7/285*** | (2017.01) |
| ***G06T 11/00*** | (2006.01) |
| ***H04N 13/332*** | (2018.01) |
| *H04N 13/00* | (2018.01) |

(52) U.S. Cl.

CPC .............. *A63F 13/26* (2014.09); *A63F 13/52* (2014.09); *G06T 7/285* (2017.01); *G06T 11/00* (2013.01); *H04N 13/332* (2018.05); *G06T 2207/10021* (2013.01); *H04N 2013/0085* (2013.01)

(58) Field of Classification Search

CPC .......... A63F 13/26; A63F 13/52; G06T 7/285; G06T 11/00; G06T 2207/10021; H04N 13/332; H04N 2013/0085

See application file for complete search history.

(56) References Cited

U.S. PATENT DOCUMENTS

| | | | | |
|---|---|---|---|---|
| 10,083,544 | B2 * | 9/2018 | Chen | G06F 3/005 |
| 2018/0005387 | A1 * | 1/2018 | Lee | H04N 19/182 |
| 2019/0243472 | A1 * | 8/2019 | Stafford | G02B 27/017 |
| 2020/0394410 | A1 * | 12/2020 | Zhang | G01C 21/1656 |
| 2021/0124174 | A1 * | 4/2021 | Tokunaga | H04N 17/002 |

(Continued)

FOREIGN PATENT DOCUMENTS

| | | |
|---|---|---|
| JP | 2015-095045 A | 5/2015 |

*Primary Examiner* — Malina D. Blaise

(74) *Attorney, Agent, or Firm* — Kilpatrick Townsend & Stockton LLP

(57) ABSTRACT

There is provided an information processing apparatus including at least one processor including hardware, in which the at least one processor predicts a first amount of movement of a head-mounted display between a first time and a second time, by using images captured of a periphery of the head-mounted display respectively at the first time and the second time, derives a degree of reliability of the predicted first amount of movement, predicts a second amount of movement of the head-mounted display between the first time and the second time, by using sensor data acquired by a posture sensor between the first time and the second time, generates a display image to be displayed on a display different from the head-mounted display, and determines whether or not to generate a display image including a pattern representing a still image.

20 Claims, 8 Drawing Sheets

15

(56) References Cited

U.S. PATENT DOCUMENTS

| | | | | |
|---|---|---|---|---|
| 2023/0192121 A1* | 6/2023 | Zhang | ............... | G06F 18/23213 701/25 |
| 2024/0273758 A1* | 8/2024 | Minamino | ............. | G06F 3/011 |

* cited by examiner

10

130

INFORMATION PROCESSING APPARATUS AND IMAGE GENERATING METHOD

CROSS REFERENCE TO RELATED APPLICATION

This application claims the benefit of Japanese Priority Patent Application JP 2022-121444 filed Jul. 29, 2022, the entire contents of which are incorporated herein by reference.

BACKGROUND

The present disclosure relates to a technology that predicts at least either a position or a posture of a head-mounted display in reference to an image captured of the periphery of the head-mounted display (HMD).

In recent years, it has been customary for video game users to wear an HMD on their head and play video games by operating a game controller while viewing game images displayed on the HMD. When the HMD carries out its tracking process to link the video images of a game space displayed on the HMD to the movement of the user's head, the video game users are allowed to experience an increased sense of immersion in the video images that makes the video games more entertaining.

An example of the related art is disclosed in Japanese Patent Laid-open No. 2015-95045.

SUMMARY

There has been known in the art "simultaneous localization and mapping" (SLAM) as a technology for predicting the position and/or posture of an HMD. SLAM that simultaneously performs self-position prediction and environmental map generation is capable of predicting the position and/or posture of an HMD by tracking feature points with use of images captured by a camera mounted on the HMD.

If a television (TV) set that is displaying moving images is present near an HMD and is included as a large part in an image captured by a camera on the HMD, then the tracking process performed by the HMD may fail to extract effective feature points, tending to cause a tracking lost error. In particular, a game system in which an HMD displays game images while at the same time a TV set displays the same game images is likely to suffer a reduction in tracking accuracy when a camera mounted on the HMD captures the game images displayed by the TV set.

It is desirable to provide a technology for highly accurately predicting at least either the position or the posture of an HMD in an environment in which a display different from the HMD is present.

There is provided according to one mode of the present disclosure an information processing apparatus including a prediction processing section that predicts a first amount of movement of a head-mounted display between a first time and a second time, by using images captured of a periphery of the head-mounted display respectively at the first time and the second time, and derives a degree of reliability of the predicted first amount of movement, and an image generating section that generates a display image to be displayed on a display different from the head-mounted display. The image generating section has a function to generate a display image including a pattern representing a still image in at least a portion thereof. The prediction processing section predicts a second amount of movement of the head-mounted display between the first time and the second time, by using sensor data acquired by a posture sensor incorporated in the head-mounted display between the first time and the second time. The information processing apparatus also includes a pattern controlling section that determines whether or not to control the image generating section to generate the display image including the pattern, according to a difference between the first amount of movement and the second amount of movement and the degree of reliability of the first amount of movement.

There is also provided according to another mode of the present disclosure an image generating method including predicting a first amount of movement of a head-mounted display between a first time and a second time, by using images captured of a periphery of the head-mounted display respectively at the first time and the second time, deriving a degree of reliability of the predicted first amount of movement, predicting a second amount of movement of the head-mounted display between the first time and the second time, by using sensor data acquired by a posture sensor incorporated in the head-mounted display between the first time and the second time, generating a display image to be displayed on a display different from the head-mounted display, and determining whether or not to generate a display image including a pattern representing a still image, according to a difference between the first amount of movement and the second amount of movement and the degree of reliability of the first amount of movement.

DETAILED DESCRIPTION OF THE PREFERRED EMBODIMENT

Figure 1:
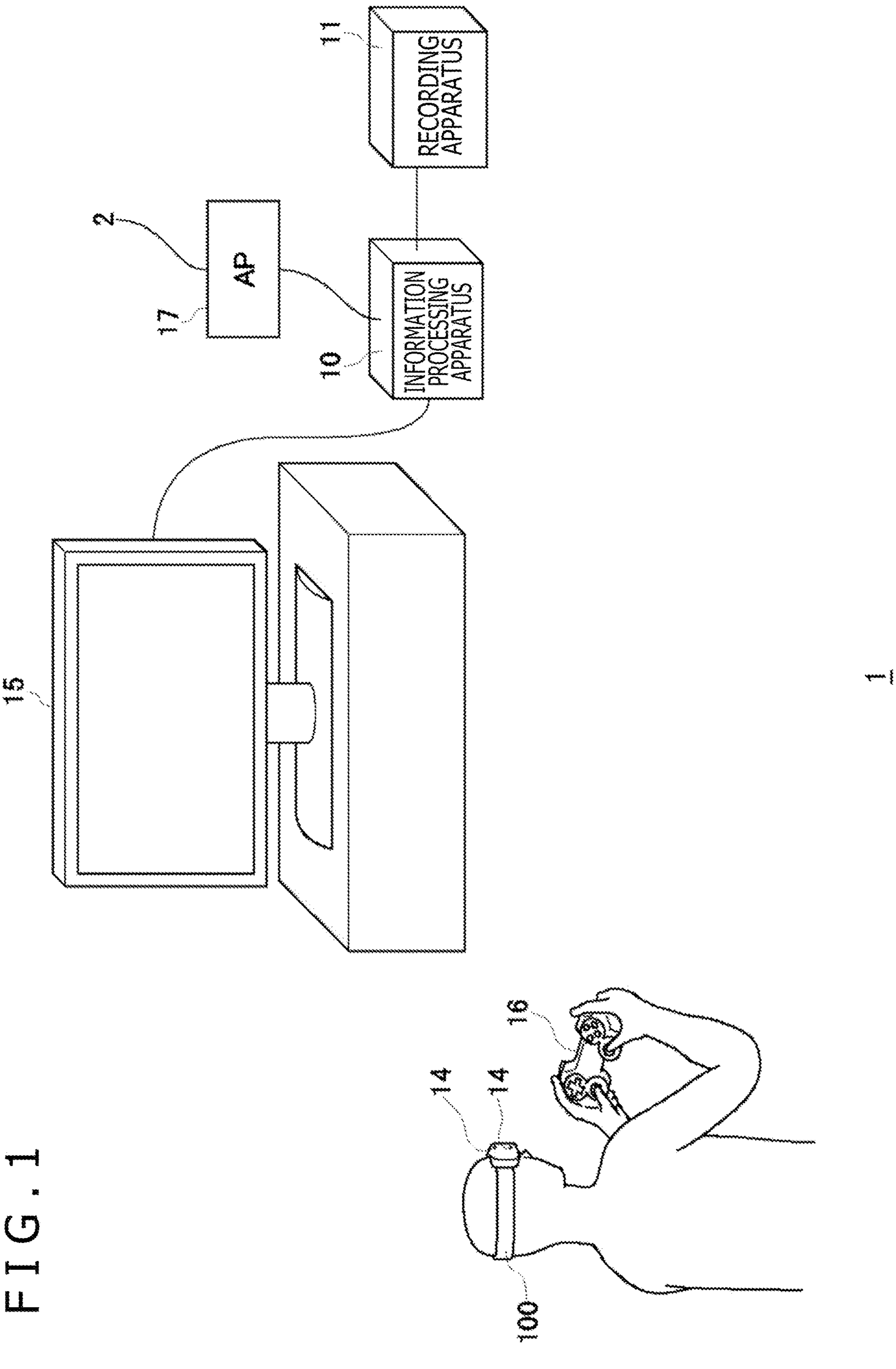
FIG. 1 is a perspective view illustrating a configurational example of an information processing system.

FIG. 1 illustrates in perspective a configurational example of an information processing system 1 according to an embodiment. As illustrated in FIG. 1, the information processing system 1 includes an information processing apparatus 10, a recording apparatus 11, an HMD 100, an input device 16 operable by the user with his/her hands and fingers, and an output apparatus 15 for outputting images and sounds. The output apparatus 15 is a display apparatus different from the HMD 100, and may be a stationary TV set or a projector for projecting video images onto a screen, a wall, or the like. The information processing apparatus 10 is electrically connected to an external network 2 such as the Internet via an access point (AP) 17. The AP 17 has the functions of a wireless access point and a router. The information processing apparatus 10 may be electrically connected to the AP 17 by a cable or according to a known wireless protocol.

The recording apparatus 11 records therein applications such as system software and game software. The information processing apparatus 10 may download to the recording apparatus 11 game software from a content server via the external network 2. The information processing apparatus 10 executes a game program and supplies image data and sound data of the game to the HMD 100. The information processing apparatus 10 and the HMD 100 may be electrically connected to each other according to a known wireless protocol or by a cable.

The HMD 100 is a display apparatus that, when worn on the user's head, displays images on respective display panels positioned in front of the user's eyes. The HMD 100 separately displays a left-eye image on the display panel for the left eye and a right-eye image on the display panel for the right eye. These images constitute parallax images as viewed from the left and right viewpoints, realizing a stereoscopic image. Since the user sees the display panels through optical lenses, the information processing apparatus 10 supplies the HMD 100 with parallax image data where the optical distortions caused by the lenses have been corrected.

Though the user who is wearing the HMD 100 does not need the output apparatus 15, the output apparatus 15 allows other users to view images displayed on the output apparatus 15. The information processing apparatus 10 may display images that are the same as those images viewed by the user wearing the HMD 100 on the output apparatus 15 or may display images that are different from those images viewed by the user wearing the HMD 100 on the output apparatus 15.

The information processing apparatus 10 and the input device 16 may be electrically connected to each other according to a known wireless protocol or by a cable. The input device 16 includes a plurality of operating members such as operating buttons. The user operates the operating members with his/her hands and fingers while gripping the input device 16. When the information processing apparatus 10 executes a game program, the input device 16 is used as a game controller.

The HMD 100 incorporates a plurality of image capturing devices 14 that are mounted in respective different positions on a front surface thereof. The image capturing devices 14 may have visible-light sensors for use in general digital video cameras, such as charge-coupled devices (CCDs) or complementary-metal-oxide-semiconductor (CMOS) sensors. The image capturing devices 14 capture images of a front side of the user in predetermined periodic cycles of 60 frames/second, for example, at synchronized timings, and transmit the captured images to the information processing apparatus 10.

The information processing apparatus 10 has a function to predict at least either the position or the posture of the HMD 100 in reference to an image captured of the periphery of the HMD 100. Though the information processing apparatus 10 will be described hereinbelow as having a function to predict both the position and the posture of the HMD 100, it suffices to have a function to predict at least either the position or the posture of the HMD 100.

The information processing apparatus 10 predicts, using images captured respectively at a time (t−1) and a time (t) that are consecutive image capturing times, the amount of movement of the HMD 100 between the time (t−1) and the time (t), and predicts the position and the posture of the HMD 100 at the time (t) by using the position and the posture of the HMD 100 at the time (t−1) that precedes the time (t) and the amount of movement. The information processing apparatus 10 may derive the position of the HMD 100 as positional information in a coordinate system defined in actual space and may derive the posture of the HMD 100 as posture information in a coordinate system defined in actual space. The information processing apparatus 10 may also derive positional information and posture information of the HMD 100 highly accurately by further using sensor data acquired between the time (t−1) and the time (t) by a posture sensor incorporated in the HMD 100.

Figure 2:
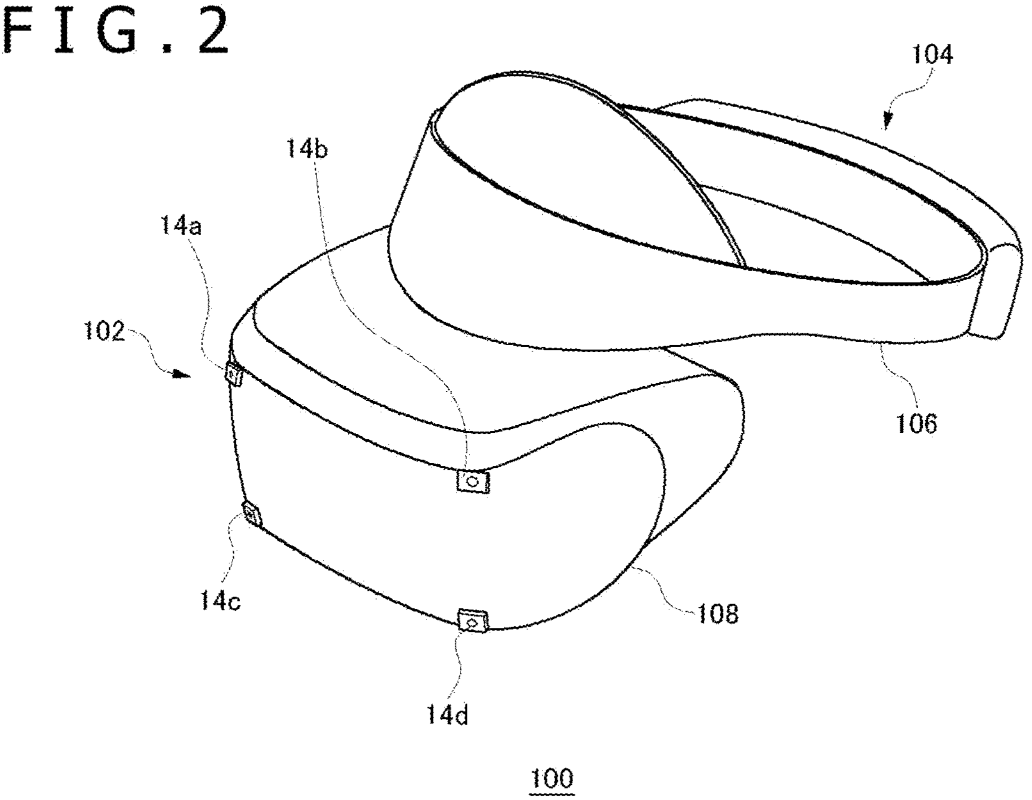
FIG. 2 is a perspective view illustrating an example of an appearance and a shape of an HMD.

FIG. 2 illustrates in perspective an example of an appearance and a shape of the HMD 100. As illustrated in FIG. 2, the HMD 100 includes an output mechanism 102 and a mount mechanism 104. The mount mechanism 104 includes a mounting band 106 that, when worn by the user, encircles the user's head to secure the HMD 100 to the user's head. The mounting band 106 is made of a material or has a structure capable of adjusting its length to match the circumference of the user's head.

The output mechanism 102 includes a housing 108 shaped to cover the left and right eyes of the user who is wearing the HMD 100. The housing 108 houses therein display panels that confront the respective eyes when the user wears the HMD 100. The display panels may be liquid crystal panels, organic electroluminescence (EL) panels, or the like. The housing 108 also houses therein a pair of left and right optical lenses to be positioned between the display panels and the user's eyes for enlarging viewing angles of the user. Furthermore, the HMD 100 may include speakers and earphones located at positions corresponding to the user's ears, and may be arranged to connect to external headphones.

The image capturing devices 14 include a plurality of image capturing devices 14*a*, 14*b*, 14*c*, and 14*d* disposed on a front outer surface of the housing 108. In terms of the forward direction of the housing 108, the image capturing device 14*a* is mounted on the upper right corner of the front outer surface of the housing 108 such that the optical axis of its sensor is oriented obliquely upwardly to the right, and the image capturing device 14*b* is mounted on the upper left corner of the front outer surface of the housing 108 such that the optical axis of its sensor is oriented obliquely upwardly to the left. The image capturing device 14*c* is mounted on the lower right corner of the front outer surface of the housing 108 such that the optical axis of its sensor is oriented in the forward direction, and the image capturing device 14*d* is mounted on the lower left corner of the front outer surface of the housing 108 such that the optical axis of its sensor is oriented in the forward direction. The image capturing device 14*c* and the image capturing device 14*d* constitute a stereo camera.

The HMD 100 transmits images captured by the image capturing devices 14 and sensor data acquired by the posture sensor to the information processing apparatus 10, and receives game image data and game sound data generated by the information processing apparatus 10.

Figure 3:
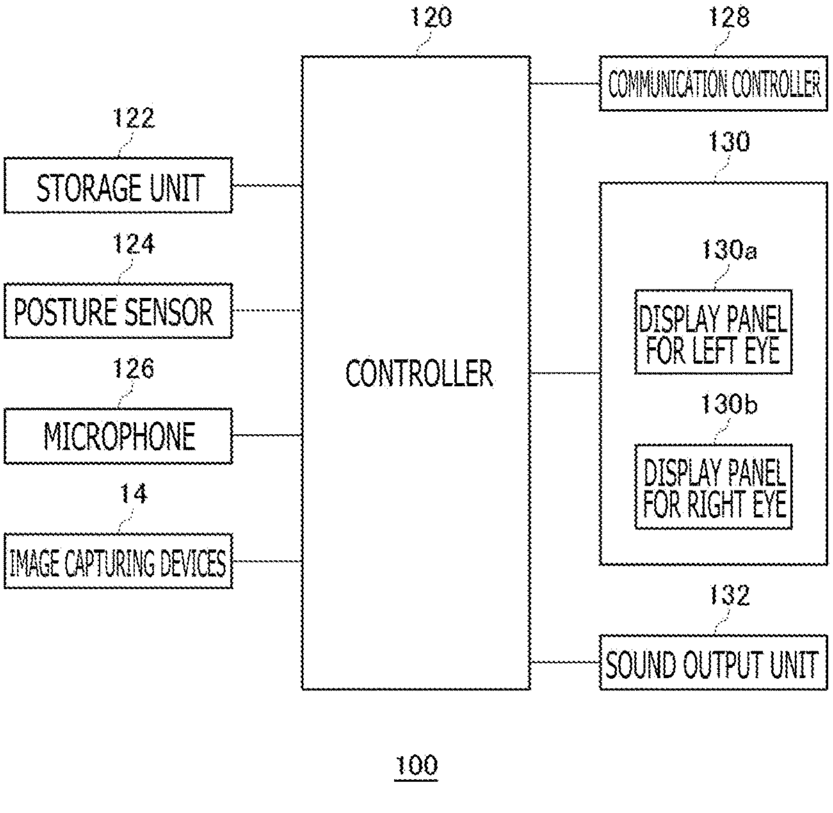
FIG. 3 is a functional block diagram of the HMD.

FIG. 3 illustrates the HMD 100 in functional block form. As illustrated in FIG. 3, a controller 120 is a main processor for processing and outputting various kinds of data such as image data, sound data, and sensor data, and commands. A storage unit 122 temporarily stores data and commands processed by the controller 120. A posture sensor 124 acquires sensor data related to the movement of the HMD 100. The posture sensor 124, which may be an inertial measurement unit (IMU), includes at least a triaxial acceleration sensor and a triaxial gyrosensor, and detects triaxial component values (sensor data) in predetermined periodic cycles (1600 Hz, for example).

A communication controller 128 transmits data output from the controller 120, to the information processing apparatus 10 that is external to the HMD 100, by way of wired or wireless communication via a network adapter or an antenna. The communication controller 128 also receives data from the information processing apparatus 10 and outputs the received data to the controller 120.

When the controller 120 receives game image data and game sound data from the information processing apparatus 10, the controller 120 supplies the game image data to display panels 130 to enable the display panels 130 to display game images, and also supplies the game sound data to a sound output unit 132 to enable the sound output unit 132 to output sounds. The display panels 130 include a display panel 130*a* for the left eye and a display panel 130*b* for the right eye, and display a pair of parallax images respectively on these display panels. The controller 120 transmits the sensor data acquired by the posture sensor 124, sound data acquired by a microphone 126, and the captured images acquired by the image capturing devices 14, from the communication controller 128 to the information processing apparatus 10.

Figure 4:
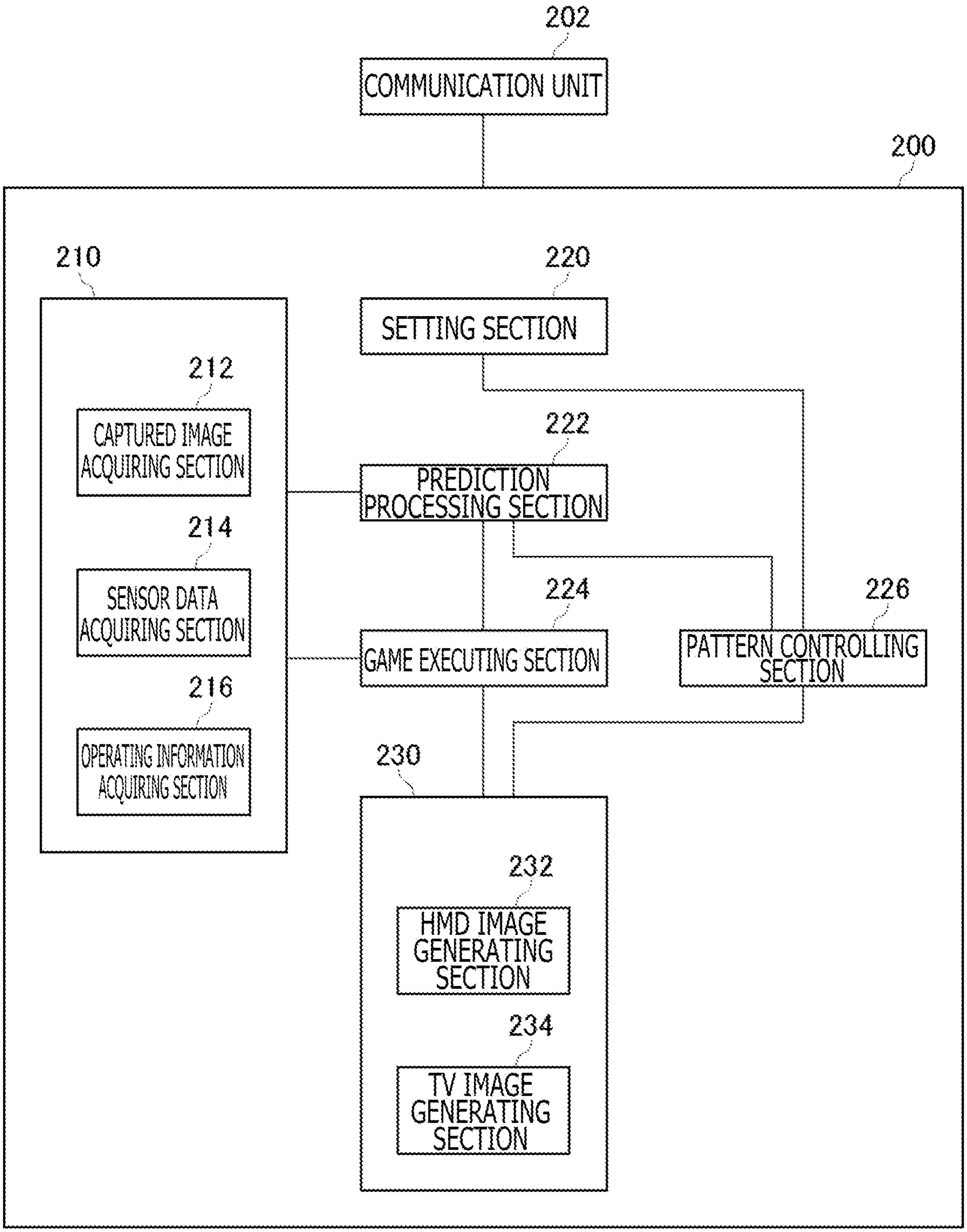
FIG. 4 is a functional block diagram of an information processing apparatus according to an embodiment of the present disclosure, included in the information processing system illustrated in FIG. 1.

FIG. 4 illustrates the information processing apparatus 10 in functional block form. As illustrated in FIG. 4, the information processing apparatus 10 includes a processor 200 and a communication unit 202. The processor 200 has an acquiring section 210, a setting section 220, a prediction processing section 222, a game executing section 224, a pattern controlling section 226, and an image generating section 230. The acquiring section 210 has a captured image acquiring section 212, a sensor data acquiring section 214, and an operating information acquiring section 216. The image generating section 230 has an HMD image generating section 232 for generating display images to be displayed on the HMD 100 and a TV image generating section 234 for generating display images to be displayed on the output apparatus 15.

The communication unit 202 receives operating information transmitted from the input device 16 and supplies the received operating information to the acquiring section 210. The communication unit 202 also receives captured images and sensor data transmitted from the HMD 100 and supplies the received captured images and sensor data to the acquiring section 210.

The information processing apparatus 10 includes a computer, and the various functions illustrated in FIG. 4 are performed when the computer runs programs. The computer includes a memory for loading the programs, one or more processors for executing the loaded programs, an auxiliary storage device, and other large scale integration (LSI) circuits as hardware. The processor or processors include a plurality of electronic circuits including semiconductor integrated circuits and LSI circuits. The electronic circuits may be incorporated in one or more chips. It will be understood by those skilled in the art that the functions illustrated in FIG. 4 are implemented by cooperation between hardware and software and hence by either hardware only, software only, or a combination of hardware and software.

The captured image acquiring section 212 acquires an image captured of the periphery of the HMD 100 and supplies the acquired image to the prediction processing section 222. The prediction processing section 222 carries out a process of predicting the position and the posture of the HMD 100 in reference to the captured image, and supplies positional information and posture information representing the predicted result of position and posture to the game executing section 224. The sensor data acquiring section 214 acquires sensor data detected by the posture sensor 124 of the HMD 100 and supplies the acquired sensor data to the prediction processing section 222. It is preferable that the prediction processing section 222 increase the accuracy with which to predict the positional information and posture information of the HMD 100, by using the supplied sensor data.

Prior to starting to play a game, the user wearing the HMD 100 performs an initial setting process for capturing an image of the user's periphery with the image capturing devices 14 and registering the captured image. In the initial setting process, the user defines a zone where the user plays the game (a zone where the user can move), in order to secure his/her own safety while playing the game. If the user is about to leave the playing zone while playing the game, the information processing apparatus 10 warns the user of the imminent risk of going out of the playing zone. During the game being played, the image of the peripheral environment that has been registered in the initial setting process may periodically be updated to generate the latest environmental map.

The prediction processing section 222 acquires a chronological sequence of images captured by the image capturing devices 14 of the HMD 100 and detects feature points by dividing each of the images into a grid. The prediction processing section 222 associates feature points with each other between an image captured at a time (t−1) (hereinafter referred to as the "first time") and an image captured at a time (t) (hereinafter referred to as the "second time"), and predicts amounts of movement of the feature points between the images captured at the different times. A process of predicting an amount of movement according to the present embodiment will be described below.

(First Time)

The prediction processing section 222 derives the three-dimensional coordinates of a plurality of feature points from two images captured respectively by the image capturing device 14*c* and the image capturing device 14*d* at the first time. According to the present embodiment, the image capturing device 14*c* and the image capturing device 14*d* constitute a stereo camera, as described above, and the prediction processing section 222 derives the three-dimensional coordinates of a plurality of (N) feature points by performing stereographic three-dimensional measurements. The derived three-dimensional coordinates are stored in the memory (not illustrated).

(Second Time)

The prediction processing section 222 derives the two-dimensional coordinates of a plurality of feature points from a single image captured by the image capturing device 14*c* at the second time. Alternatively, the prediction processing section 222 may derive the two-dimensional coordinates of a plurality of feature points from a single image captured by the image capturing device 14*d*, rather than the image capturing device 14*c*.

There is known a method of solving the Perspective n-Point (PnP) problem as a process for predicting the position and the posture of an image capturing device from an association between N (N is an integer of 3 or larger) three-dimensional points and two-dimensional coordinates of the N as projected onto the plane of an image captured by the image capturing device. The prediction processing section 222 predicts an amount Tv of movement of the image capturing device 14*c* (that is, an amount of movement in six degrees of freedom (6 DoF) of the HMD 100) from the three-dimensional coordinates of the N feature points derived at the first time and the two-dimensional coordinates of the feature points derived at the second time. Specifically, the prediction processing section 222 predicts the amount Tv of movement of the image capturing device 14*c* according to the following equation (1).

[Math. 1]

$$s\begin{bmatrix}u\\v\\1\end{bmatrix}=\begin{bmatrix}f_x&0&c_x\\0&f_y&c_y\\0&0&1\end{bmatrix}\begin{bmatrix}r_{11}&r_{12}&r_{13}&t_1\\r_{21}&r_{22}&r_{23}&t_2\\r_{31}&r_{32}&r_{33}&t_3\end{bmatrix}\begin{bmatrix}X\\Y\\Z\\1\end{bmatrix} \quad \text{(Equation 1)}$$

Here, (u, v) represents the two-dimensional coordinates of the feature points derived from the image captured at the second time, and (X, Y, Z) represents the three-dimensional coordinates of the feature points derived from the image captured by the stereo camera at the first time. The prediction processing section 222 reads the three-dimensional coordinates of the feature points from the memory (not illustrated) and acquires (X, Y, Z).

Further, ($f_x$, $f_y$) represents the focal length of the image capturing device 14*c*, and ($c_x$, $c_y$) represents the principal point of the image, both being internal parameters of the image capturing device 14*c*. The matrix having the elements $r_{11}$ through $r_{33}$ and $t_1$ through $t_3$ represents a rotation/translation matrix. In the equation (1), (u, v), ($f_x$, $f_y$), ($c_x$, $c_y$), and (X, Y, Z) are known. The prediction processing section 222 determines a rotation/translation matrix common to the N feature points by solving the equation with respect to the N feature points.

According to the present embodiment, the prediction processing section 222 solves a minimization problem where the elements of a rotation/translation matrix are parameters, by using an objective function (a cost function) indicative of an error. If the Gaussian Newton's method is used, then by finding the partial derivative of an object function with parameters, it can be found how the parameters should be adjusted to reduce the cost. The resultant partial derivative is referred to as Jacobian J (Jacobian matrix). According to the Gaussian Newton's method, Jacobian J is calculated in the course of optimization of the parameters. The prediction processing section 222 recursively updates the parameters in order to reduce the objective function, and decides on the parameters at the time a predetermined finishing condition is reached. For example, the prediction processing section 222 may determine that the finishing condition is satisfied and may decide on the parameters when the number of recurrences has reached a predetermined count or Jacobian J has become small enough. The prediction processing section 222 decides on the elements of the rotation/translation matrix, thereby predicting the amount Tv of movement of the HMD 100 between the first time and the second time. At this time, the prediction processing section 222 derives a covariance matrix Σv representing the degree of reliability (the degree of confidence) of the predicted amount Tv of movement. The covariance matrix Σv can be determined using Jacobian J according to the following equation (2).

$$\text{Covariance matrix } \Sigma v = J^T \cdot J \quad \text{(Equation 2)}$$

The covariance matrix Σv corresponds to the degree of reliability of the predicted amount Tv of movement such that the higher the degree of reliability is, the smaller the covariance matrix Σv is, and the lower the degree of reliability is, the larger the covariance matrix Σv is. Specifically, if the feature points in the image captured at the first time and the feature points in the image captured at the second time match each other, then the covariance matrix Σv is derived as small, and if they do not match each other, then the covariance matrix Σv is derived as large.

The prediction processing section 222 predicts the amount Tv of movement of the HMD 100 between the first time and the second time, and predicts the position and the posture of the HMD 100 at the second time by adding the predicted amount Tv of movement to the position and the posture of the HMD 100 at the first time. The positional information and the posture information of the HMD 100 are supplied to the game executing section 224, in which they are used as inputs to the game.

The operating information acquiring section 216 acquires operating information transmitted from the input device 16 and supplies the acquired operating information to the game executing section 224. The game executing section 224 executes a game program in reference to the operating information from the input device 16 and the positional information and the posture information of the HMD 100, and performs a calculating process for moving game characters in a virtual space. The image generating section 230 includes a graphics processing unit (GPU) for performing a rendering process, etc., and generates game images.

In the image generating section 230, the HMD image generating section 232 generates display images to be displayed on the display panels 130 of the HMD 100, whereas the TV image generating section 234 generates display images to be displayed on the output apparatus 15. Though not illustrated, the information processing apparatus 10 includes a sound generating section for generating game sounds.

Figure 5:
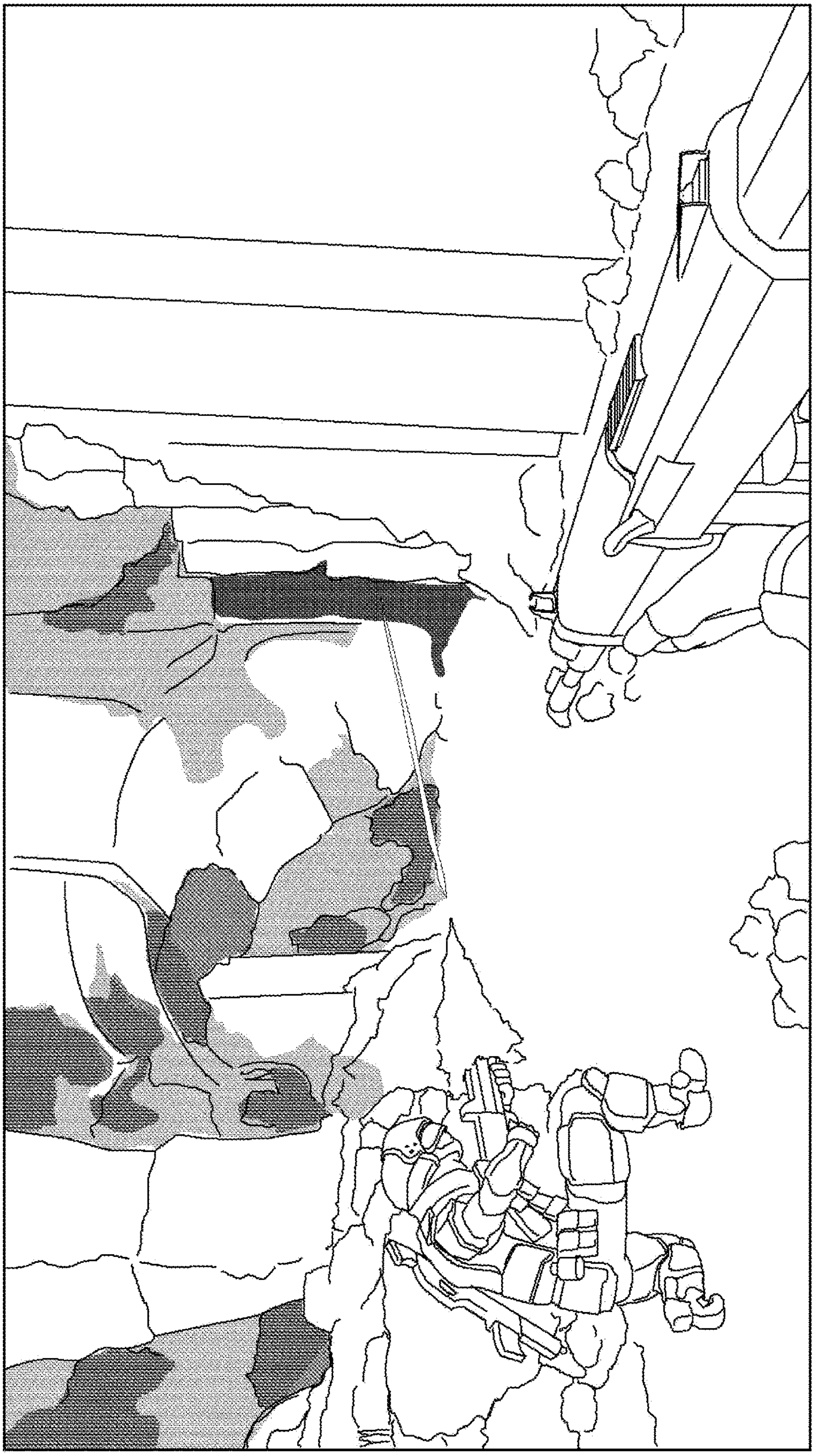
FIG. 5 is a view illustrating an example of a display image displayed on a display panel.

FIG. 5 illustrates an example of a display image displayed on the display panels 130. The HMD image generating section 232 generates game images and supplies the generated game images to the display panels 130 of the HMD 100. As described above, the display panels 130 include the display panel 130*a* for the left eye and the display panel 130*b* for the right eye. The HMD image generating section 232 generates a game image for the left eye and a game image for the right eye, and supplies the generated game images respectively to the display panel 130*a* for the left eye and the display panel 130*b* for the right eye. The display panel 130*a* for the left eye and the display panel 130*b* for the right eye display the respective supplied game images. According to the present embodiment, the TV image generating section 234 generates the same game images as the game images generated by the HMD image generating section 232 and supplies the generated game images to the output apparatus 15.

If the user wearing the HMD 100 on the head is playing the game while facing in the direction of the output apparatus 15, then providing the output apparatus 15 has a large screen size and the user is close to the output apparatus 15, the output apparatus 15 occupies a large zone in the images captured by the image capturing devices 14. At this time, the prediction processing section 222 extracts many feature points from the game image displayed on the output apparatus 15. In the event that the prediction processing section 222 fails to associate those extracted feature points with the feature points extracted in the past, it is highly possible for the prediction processing section 222 to suffer a tracking lost error.

Figure 6A:
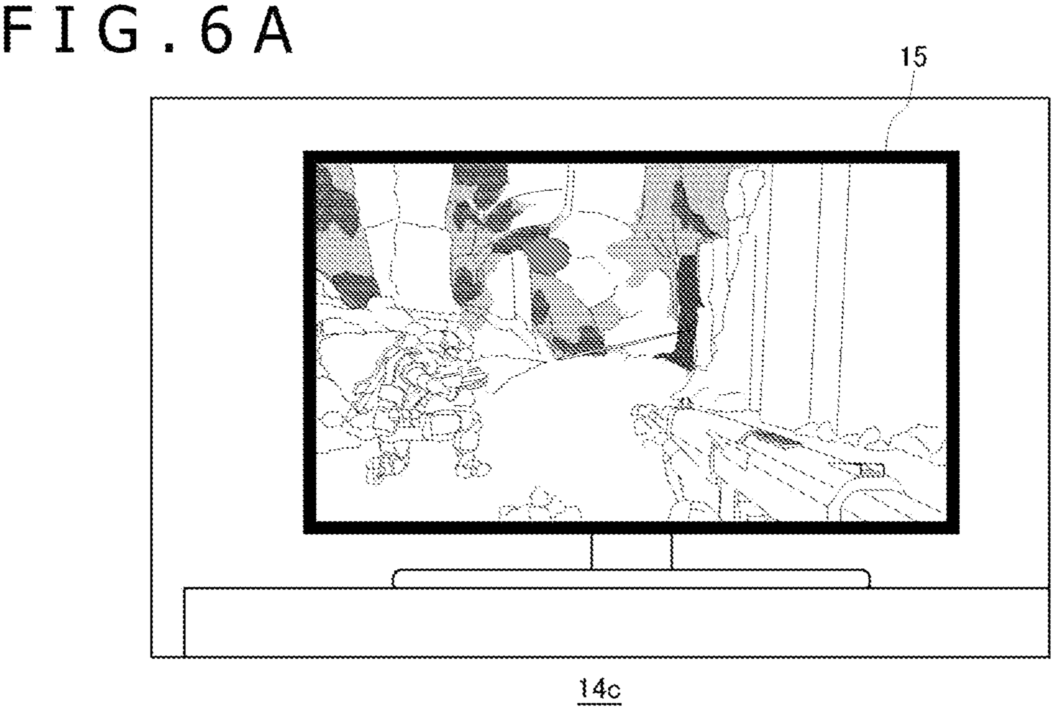
FIGS. 6A and 6B are views illustrating examples of images captured by image capturing devices.
Figure 6B:
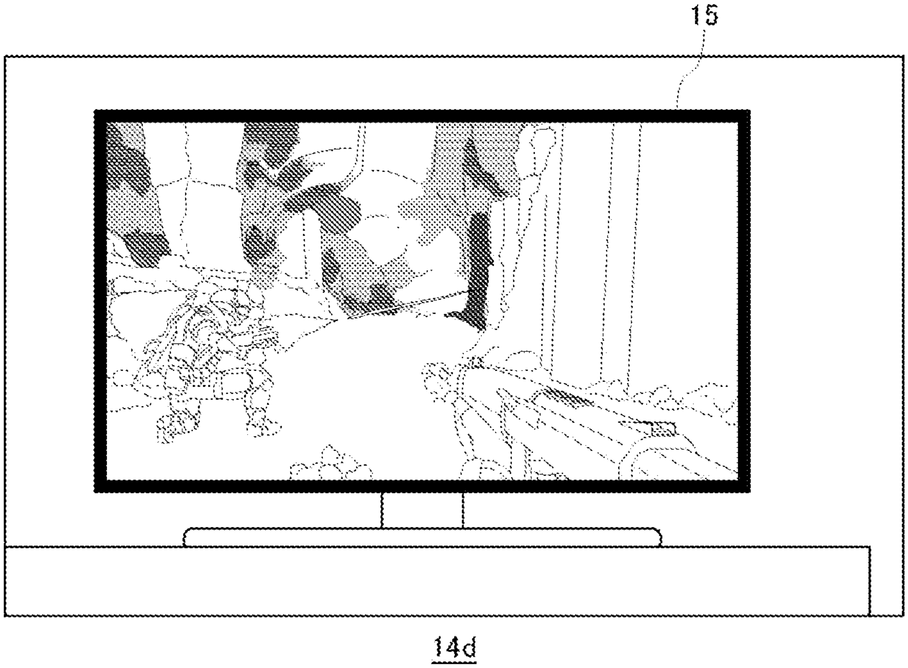

FIG. 6A illustrates an example of an image captured by the image capturing device 14*c*, and FIG. 6B illustrates an example of an image captured by the image capturing device 14*d*. Since the image capturing device 14*c* and the image capturing device 14*d* constitute a stereo camera, the illustrated captured images slightly deviate from each other horizontally. In the examples illustrated in FIGS. 6A and 6B, the game image displayed on the output apparatus 15 covers a large proportion of the captured images.

In fact, the ratio of the game image displayed on the output apparatus 15 to the captured images illustrated in FIGS. 6A and 6B is very large. As the game image changes every moment and the prediction processing section 222 finds it difficult to extract effective feature points from the captured images, the prediction processing section 222 may fail in its process of predicting the position and the posture of the HMD 100.

In the information processing apparatus 10 according to the present embodiment, the TV image generating section 234 has a function to generate a display image that includes a pattern representing a still image in at least a portion thereof. When the TV image generating section 234 generates a display image including a pattern, the prediction processing section 222 is able to extract feature points effective for tracking.

(Pattern Display Function)

Figure 7:
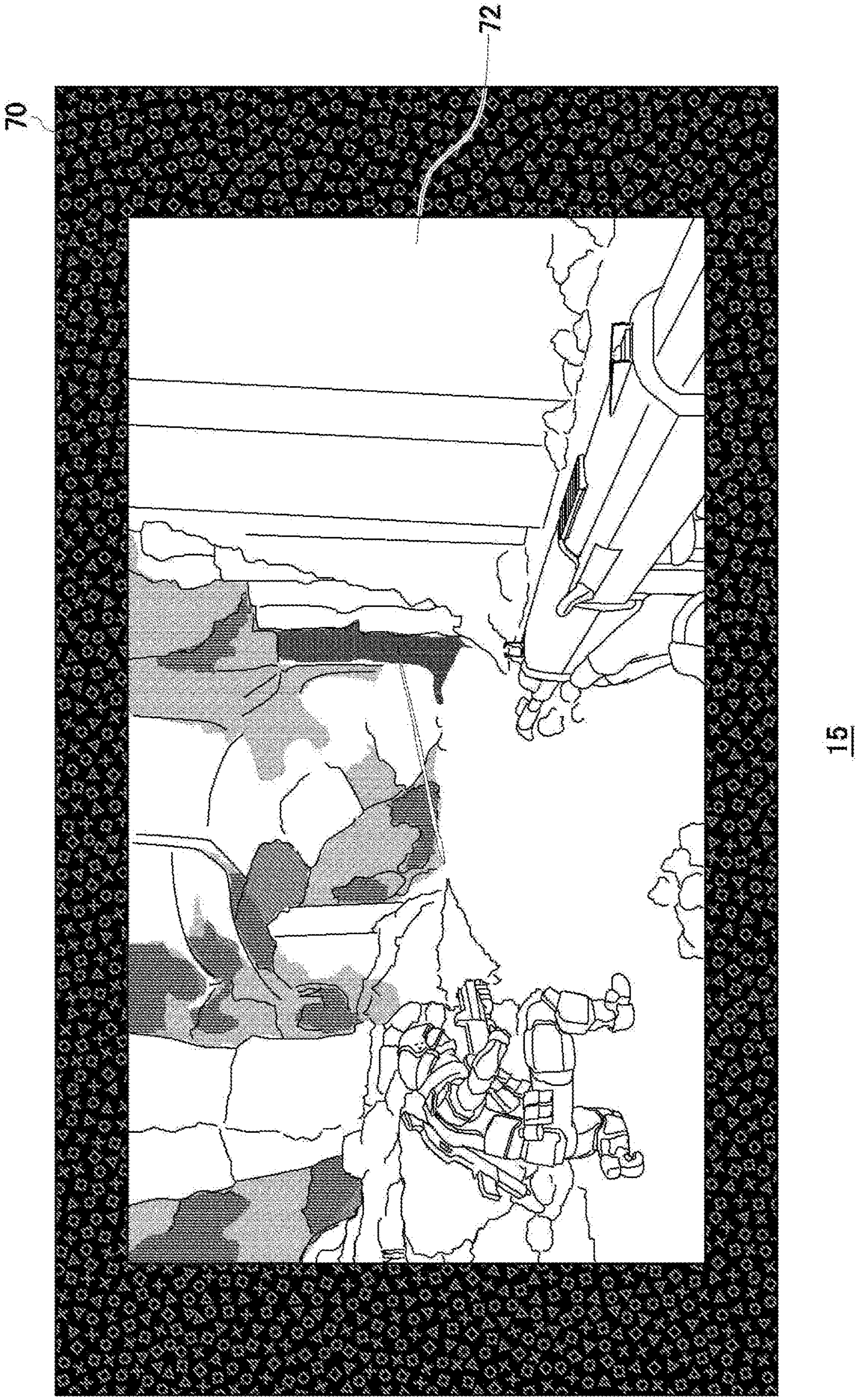
FIG. 7 is a view illustrating an example of an image displayed on an output apparatus.

FIG. 7 illustrates an example of an image displayed on the output apparatus 15. The TV image generating section 234 generates a display image that includes a pattern 70 representing a still image in a portion thereof. In the illustrated example, specifically, the TV image generating section 234 generates a display image including the pattern 70 representing a rectangular frame and a moving game image 72 within the frame, and displays the generated display image on the output apparatus 15. Since the pattern 70 representing a rectangular frame is displayed as a still image on the output apparatus 15, the prediction processing section 222 is capable of extracting feature points effective for tracking from the pattern 70 included in the image captured of the output apparatus 15.

The TV image generating section 234 may generate and display on the output apparatus 15 a moving game image 72 having a reduced image size within the rectangular frame represented by the pattern 70, though it may generate a display image where the rectangular frame represented by the pattern 70 is superposed on a moving game image 72 that is not scaled down. In order to ensure visibility of the moving game image 72, it is preferable that the image zone occupied by the frame be 50% or less of the screen size of the output apparatus 15. The TV image generating section 234 may display a pattern 70 as blocks in the respective four corners of the screen of the output apparatus 15, for example, rather than as a rectangular frame. In other words, the TV image generating section 234 may generate a display image including a pattern 70 as block images in its corners. Alternatively, the TV image generating section 234 may generate a display image including a pattern 70 on either one or more of upper, lower, left, and right sides thereof, so that the pattern 70 will be displayed on either one or more of upper, lower, left, and right sides of the screen of the output apparatus 15. At any rate, the pattern 70 is displayed as a still image in order to support the tracking process carried out by the prediction processing section 222.

Inasmuch as the prediction processing section 222 extracts corners included in the captured images as feature points, the pattern 70 should preferably be of a design containing many corners. In order to increase the accuracy of tracking, the pattern 70 should preferably be free of a repetition of identical forms in close positions.

The setting section 220 sets ON or OFF of a pattern display function of the TV image generating section 234. The user may set ON or OFF of the pattern display function of the TV image generating section 234 in the initial setting process.

Figure 8:
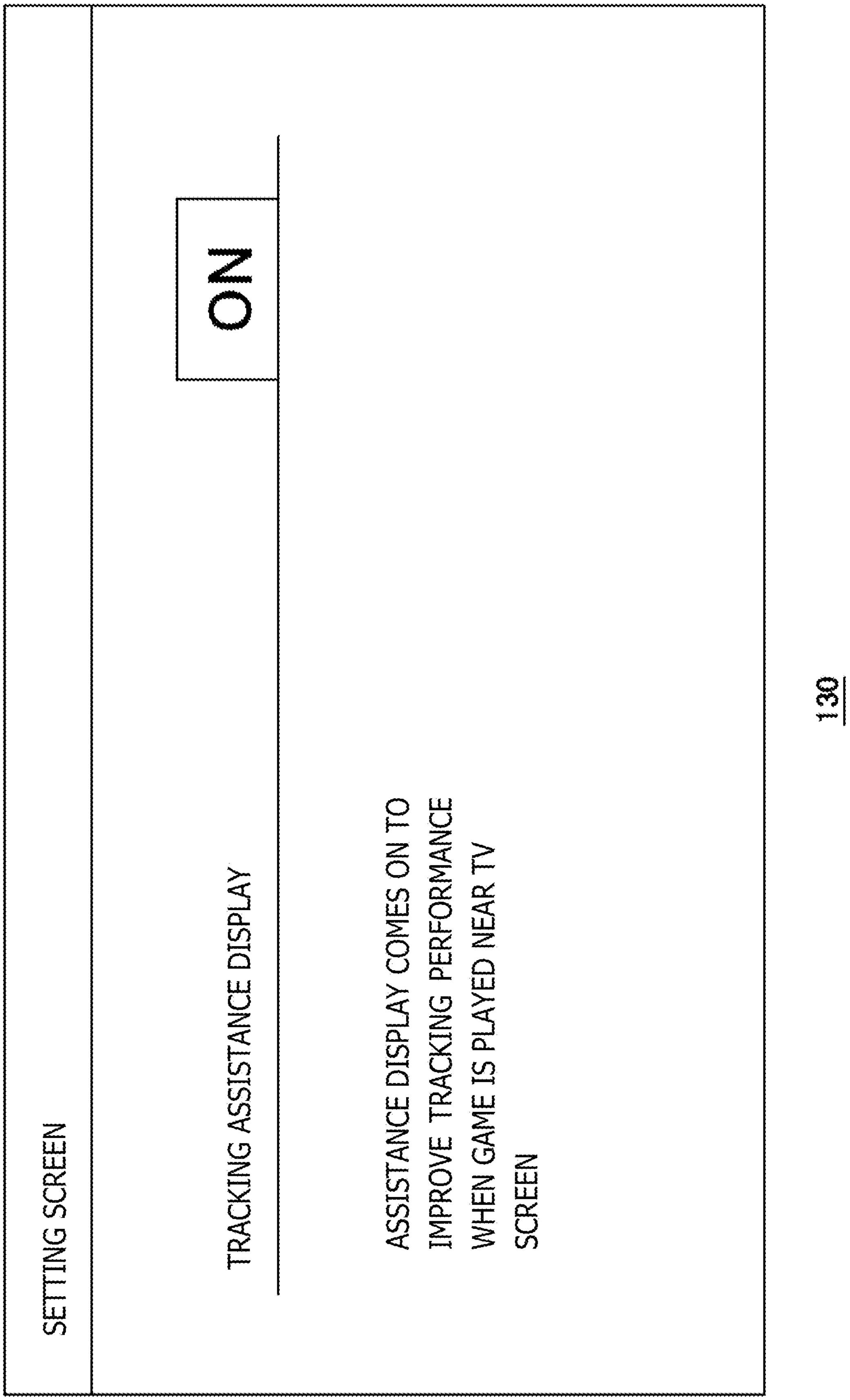
FIG. 8 is a view illustrating an example of a screen for setting ON/OFF of a pattern display function.

FIG. 8 illustrates an example of a screen for setting ON or OFF of the pattern display function. The screen for setting ON or OFF of the pattern display function is displayed on the display panels 130 in the initial setting process. When the user sets "TRACKING ASSISTANCE DISPLAY" to ON, the setting section 220 makes the pattern display function active. When the pattern display function is active, if a predetermined condition is fulfilled, the TV image generating section 234 generates a display image including the pattern 70. When the user sets "TRACKING ASSISTANCE DISPLAY" to OFF, the setting section 220 makes the pattern display function inactive.

When the pattern display function is inactive, the prediction processing section 222 may fail in its process of predicting the position and the posture of the HMD 100, by performing the tracking process with use of images captured of the game image displayed on the output apparatus 15. If the prediction processing section 222 may fail in the predicting process, then the pattern display function of the TV image generating section 234 may automatically be made active, so that the pattern display function can be performed.

<Condition for Performing the Pattern Display Function>

The accuracy with which the prediction processing section 222 predicts the amount Tv of movement of the HMD 100 is increased by displaying the pattern 70. However, the displayed pattern 70 has a disadvantage on its own in that it reduces the zone where the moving game image 72 is displayed, as illustrated in FIG. 7. Accordingly, the pattern 70 should preferably not be displayed at all times, and should preferably be displayed only in situations where the accuracy with which to predict the amount Tv of movement of the HMD 100 tends to be lowered.

As a result of a test conducted on the tracking process in various environments, the present discloser has specified factors in the reduction in the accuracy with which to predict the amount of movement, as follows.

(Factor 1)

In an environment with few fixed feature points (a textureless environment), the output apparatus 15 displays a game image linked with the movement of the HMD 100, and the image capturing devices 14 of the HMD 100 capture the game image displayed on the output apparatus (see FIGS. 6A and 6B).

(Factor 2)

When the user wearing the HMD 100 turns his/her head laterally, the images displayed on the display panels 130 change depending on the angle through which the user's head turns. Since the same game image is displayed on the output apparatus 15, the feature points of the game image are also moved on the screen of the output apparatus 15. At this time, if the proportion of the game image in the image captured by the image capturing device 14*c* is large as illustrated in FIG. 6A, then the prediction processing section 222 extracts many feature points from the game image and predicts the amount Tv of movement of the HMD 100 from the extracted feature points. However, as the feature points extracted from the game image are moved in the screen in linked relation to the movement of the HMD 100, the prediction processing section 222 is unable to accurately predict the amount Tv of movement of the HMD 100 according to the moved feature points. In such a case, the pattern 70 should preferably be displayed to support the prediction processing section 222 in its process of tracking the feature points.

In such a situation, since the image captured at the first time and the image captured at the second time match each other (no contradiction occurs between the captured images as the game image is simply moved laterally on the screen of the output apparatus 15), the prediction processing section 222 can predict the amount Tv of movement of the HMD 100 without fail, and the covariance matrix Σv representing the degree of reliability of the predicted amount Tv of movement has a small value (that is, the covariance matrix Σv represents a high degree of reliability). According to the present embodiment, under these circumstances, the pattern controlling section 226 determines to control the TV image generating section 234 to generate a display image including the pattern 70.

As described above, the prediction processing section 222 predicts the amount Tv of movement of the HMD 100 between the first time and the second time by using the images captured of the periphery of the HMD 100 respectively at the first time and the second time, and derives the covariance matrix Σv representing the degree of reliability of the predicted amount Tv of movement. As described above, the higher the degree of reliability of the predicted amount Tv of movement is, the smaller the covariance matrix Σv is, and the lower the degree of reliability of the predicted amount Tv of movement is, the larger the covariance matrix Σv is. The prediction processing section 222 provides the predicted amount Tv of movement and the derived covariance matrix Σv to the pattern controlling section 226.

The prediction processing section 222 according to the present embodiment predicts an amount Ti of movement of the HMD 100 between the first time and the second time by using the sensor data acquired between the first time and the second time by the posture sensor 124 of the HMD 100. Specifically, the prediction processing section 222 integrates an acceleration to calculate a change in speed, integrates a speed predicted using the change in speed to calculate a change in position, and integrates an angular velocity to calculate a change in posture, thereby predicting an amount Ti of movement in six degrees of freedom of the HMD 100. Though the prediction processing section 222 predicts the amount Ti of movement of the HMD 100 between the first time and the second time by using the posture and the speed of the HMD 100 at the first time, the posture and the moving speed of the HMD 100 at the first time may be the posture and the moving speed predicted at the first time by the prediction processing section 222. The prediction processing section 222 provides the amount Ti of movement predicted in reference to the sensor data to the pattern controlling section 226.

Figure 9:
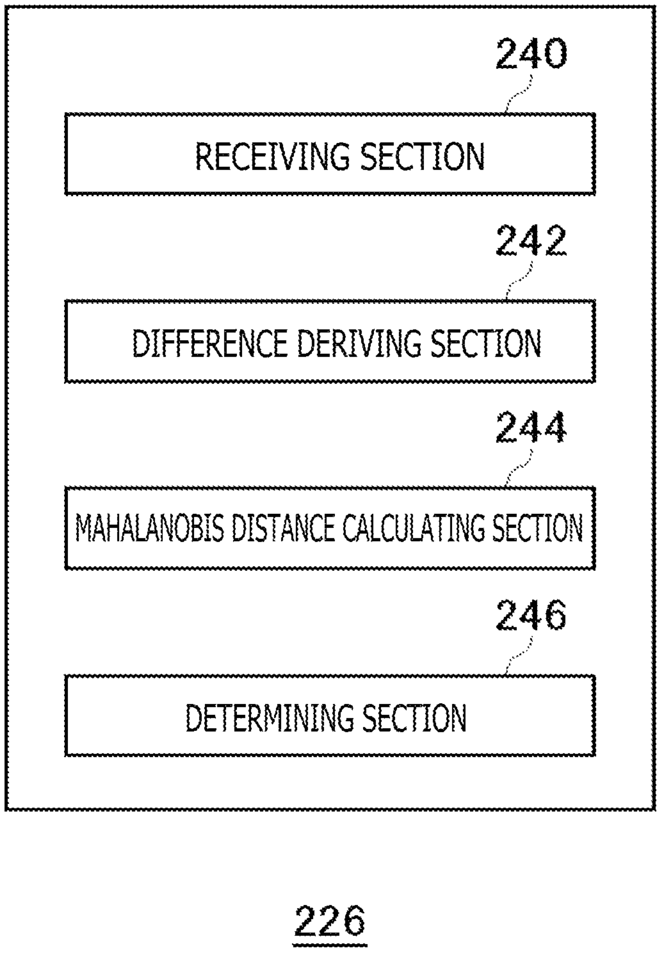
FIG. 9 is a functional block diagram of a pattern controlling section.

FIG. 9 illustrates the pattern controlling section 226 in functional block form. As illustrated in FIG. 9, the pattern controlling section 226 has a receiving section 240, a difference deriving section 242, a Mahalanobis distance calculating section 244, and a determining section 246. The pattern controlling section 226 has a function to determine whether or not to control the TV image generating section 234 to generate a display image including the pattern 70 representing a still image, according to the difference between the amount Ti of movement and the amount Tv of movement and the degree of reliability of the amount Tv of movement.

The receiving section 240 receives the amount Tv of movement derived at the second time, the covariance matrix Σv, and the amount Ti of movement from the prediction processing section 222. The difference deriving section 242 calculates the difference ΔT between the amount Ti of movement and the amount Tv of movement according to the following equation (3).

$$\Delta T = Ti - Tv \quad \text{(Equation 3)}$$

The Mahalanobis distance calculating section 244 calculates a Mahalanobis distance D according to the following equation (4).

[Math. 2]

$$D = \sqrt{\Delta T^T \cdot \Sigma_V^{-1} \cdot \Delta T} \quad \text{(Equation 4)}$$

The determining section 246 determines whether or not the TV image generating section 234 is to generate a display image including the pattern 70, according to the difference ΔT between the amount Ti of movement and the amount Tv of movement and the covariance matrix Σv representing the degree of reliability of the amount Tv of movement. Specifically, the determining section 246 determines whether or not the TV image generating section 234 is to generate a display image including the pattern 70, from the Mahalanobis distance D calculated using the difference ΔT and the covariance matrix Σv.

According to the present embodiment, a large Mahalanobis distance D means a large difference ΔT between the amounts of movement and a small covariance matrix Σv (a high degree of reliability of the amount Tv of movement). A large difference ΔT between the amounts of movement means that the amount Tv of movement predicted from the captured images and the amount Ti of movement predicted from the sensor data are largely different from each other, i.e., the amount Tv of movement predicted from the captured images is not correct. The foregoing is premised on the assumption that the amount Ti of movement predicted from the sensor data is regarded as accurate in a short period of time, e.g., 1/60 second. Consequently, a large Mahalanobis distance D means a high degree of reliability of the amount Tv of movement despite the fact that the amount Tv of movement is not correct, and corresponds to an environment where the factor 1 and the factor 2 are fulfilled. Hence, the determining section 246 determines whether or not the TV image generating section 234 is to generate a display image including the pattern 70, from the Mahalanobis distance D, and determines to have the TV image generating section 234 generate a display image including the pattern 70 if the Mahalanobis distance D satisfies a predetermined condition. The determining section 246 may determine to have the TV image generating section 234 generate a display image including the pattern 70 if the Mahalanobis distance D is equal to or larger than a predetermined threshold value Th.

While the user wearing the HMD 100 faces a white ceiling with few feature points (the output apparatus 15 is not present on a ceiling), for example, the image capturing devices 14 capture images of the white ceiling, and the prediction processing section 222 is unable to extract effective feature points from the captured images. Thus, the predicted amount Tv of movement is not accurate, and the covariance matrix Σv representing the degree of reliability of the predicted amount Tv of movement is large. At this time, though the difference ΔT between the amount Ti of movement calculated from the sensor data of the posture sensor 124 and the amount Tv of movement calculated from the captured images is large, the Mahalanobis distance D is not so large because the covariance matrix Σv is of a large value. Hence, the determining section 246 may determine not to have the TV image generating section 234 generate a display image including the pattern 70. In this case, since the output apparatus 15 is not included in the images captured by the image capturing devices 14, it is not necessary to include the pattern 70 in the image displayed on the output apparatus 15. The determining section 246 according to the present embodiment thus does not determine to include the pattern 70 in the displayed image simply when the difference ΔT is large, but determines whether or not to include the pattern 70 in the displayed image in reference to the magnitude of the Mahalanobis distance D. Consequently, it is possible to include the pattern 70 in the displayed image only when it is required for the tracking process.

The determining section 246 may determine whether or not to generate a display image including the pattern according to the result of a digital filtering process performed on the Mahalanobis distance D calculated at every time, with use of an infinite-impulse-response (IIR) filter. For example, if the result of the digital filtering process performed on the Mahalanobis distance D with use of the IIR filter is equal to or larger than a threshold value or if the result of the digital filtering process is equal to or larger than a threshold value continuously for a predetermined period of time, then the determining section 246 may determine that the captured images are not suitable for deriving the amount Tv of movement and may determine not to include the pattern 70 in a display image. If the calculated Mahalanobis distance D exceeds a predetermined value prior to the digital filtering process, then a predetermined value rather than the Mahalanobis distance D may be input to the IIR filter to avoid a situation where the result of the digital filtering process simply becomes equal to or larger than the threshold value.

The present disclosure has been described above according to the embodiment. The above embodiment is merely an illustrative example, and it will be understood by those skilled in the art that various changes and modifications may be made in the components and processing processes of the embodiment and may also fall within the scope of the disclosure. According to the embodiment, the information processing apparatus 10 carries out the predicting process. However, the functions of the information processing apparatus 10 may in part or in whole be provided in the HMD 100, so that the HMD 100 may carry out the predicting process while functioning as an information processing apparatus.

According to the embodiment, the image capturing devices 14 are incorporated in the HMD 100. However, insofar as the image capturing devices 14 are able to capture images of a space in the periphery of the HMD 100, the image capturing devices 14 may be located in positions other than the HMD 100.

The pattern controlling section 226 may select a pattern 70 to be displayed depending on the screen size of the output apparatus 15. Specifically, if the screen size is small, the pattern controlling section 226 may select a pattern 70 including large designs, and if the screen size is large, the pattern controlling section 226 may select a pattern 70 including small designs. The pattern controlling section 226 may select a pattern 70 according to the ratio of the image of the output apparatus 15 to the captured images.

What is claimed is:

1. An information processing apparatus comprising:

at least one processor including hardware, a memory storing instructions that, upon execution by the at least one processor, configure the at least one processor to:

predict a first amount of movement of a head-mounted display between a first time and a second time, by using images captured of a periphery of the head-mounted display respectively at the first time and the second time;

derive a degree of reliability of the predicted first amount of movement;

predict a second amount of movement of the head-mounted display between the first time and the second time, by using sensor data acquired by a posture sensor incorporated in the head-mounted display between the first time and the second time;

determine whether to include a pattern representing a still image in a display image, according to a difference between the first amount of movement and the second amount of movement and the degree of reliability of the first amount of movement; and generate a display image comprising an image of a video, and further comprising the pattern, if determined, to be displayed on a display device different from the head-mounted display.

2. The information processing apparatus according to claim 1, wherein the at least one processor is configured to determine whether to generate the display image including the pattern, according to a covariance matrix representing the degree of reliability of the first amount of movement.

3. The information processing apparatus according to claim 1, wherein the at least one processor is configured to determine whether to generate the display image including the pattern based on a Mahalanobis distance calculated using the difference between the first amount of movement and the second amount of movement and the degree of reliability of the first amount of movement.

4. The information processing apparatus according to claim 3, wherein the at least one processor is configured to determine whether to generate the display image including the pattern, according to a result of a filtering process performed on the Mahalanobis distance with use of an infinite-impulse-response filter.

5. The information processing apparatus according to claim 1, wherein the at least one processor is configured to determine that the images are not suitable for deriving the first amount of movement, according to the difference between the first amount of movement and the second amount of movement and the degree of reliability of the first amount of movement.

6. The information processing apparatus according to claim 1, wherein the display image is in linked relation to the movement of the head-mounted display.

7. The information processing apparatus according to claim 1, wherein the at least one processor is further configured to:

select a type or design of the pattern representing the still image based on an analysis of the environment captured by the head-mounted display, wherein the analysis comprises:

identifying regions in the captured images lacking fixed feature points; and selecting a pattern design with enhanced corner features for such environments.

8. The information processing apparatus according to claim 1, wherein the at least one processor is further configured to:

compare the degree of reliability of the predicted first amount of movement to a predetermined reliability threshold; and determine to generate the display image including the pattern if the degree of reliability is below the threshold.

9. A method comprising:

predicting a first amount of movement of a head-mounted display between a first time and a second time, by using images captured of a periphery of the head-mounted display respectively at the first time and the second time;

deriving a degree of reliability of the predicted first amount of movement;

predicting a second amount of movement of the head-mounted display between the first time and the second time, by using sensor data acquired by a posture sensor incorporated in the head-mounted display between the first time and the second time;

determining whether to include a pattern representing a still image in the display image, according to a difference between the first amount of movement and the second amount of movement and the degree of reliability of the first amount of movement; and generating the display image comprising an image of a video, and further comprising the pattern, if determined, to be displayed on a display device different from the head-mounted display.

10. The method of claim 9, wherein determining whether to generate the display image including the pattern is according to a covariance matrix representing the degree of reliability of the first amount of movement.

11. The method of claim 9, wherein determining whether to generate the display image including the pattern is based on a Mahalanobis distance calculated using the difference between the first amount of movement and the second amount of movement and the degree of reliability of the first amount of movement.

12. The method of claim 11, wherein determining whether to generate the display image including the pattern, according to a result of a filtering process performed on the Mahalanobis distance with use of an infinite-impulse-response filter.

13. The method of claim 9, further comprising determining that the images are not suitable for deriving the first amount of movement, according to the difference between the first amount of movement and the second amount of movement and the degree of reliability of the first amount of movement.

14. The method of claim 9, wherein the display image is in linked relation to the movement of the head-mounted display.

15. A non-transitory, computer-readable storage medium containing a program, which when executed by at least one processor, causes the at least one processor to perform a process, comprising:

predicting a first amount of movement of a head-mounted display between a first time and a second time, by using images captured of a periphery of the head-mounted display respectively at the first time and the second time;

deriving a degree of reliability of the predicted first amount of movement;

predicting a second amount of movement of the head-mounted display between the first time and the second time, by using sensor data acquired by a posture sensor incorporated in the head-mounted display between the first time and the second time;

determining whether to include a pattern representing a still image in a display image, according to a difference between the first amount of movement and the second amount of movement and the degree of reliability of the first amount of movement; and generating the display image comprising an image of a video, and further comprising the pattern, if determined, to be displayed on a display device different from the head-mounted display.

16. The non-transitory, computer-readable storage medium of claim 15, wherein determining whether to generate the display image including the pattern is according to a covariance matrix representing the degree of reliability of the first amount of movement.

17. The non-transitory, computer-readable storage medium of claim 15, wherein determining whether to generate the display image including the pattern is based on a Mahalanobis distance calculated using the difference between the first amount of movement and the second amount of movement and the degree of reliability of the first amount of movement.

18. The non-transitory, computer-readable storage medium of claim 17, wherein determining whether to generate the display image including the pattern, according to a result of a filtering process performed on the Mahalanobis distance with use of an infinite-impulse-response filter.

19. The non-transitory, computer-readable storage medium of claim 15, wherein the process further comprises determining that the images are not suitable for deriving the first amount of movement, according to the difference between the first amount of movement and the second amount of movement and the degree of reliability of the first amount of movement.

20. The non-transitory, computer-readable storage medium of claim 15, wherein the display image is in linked relation to the movement of the head-mounted display.

* * * * *